United States Patent [19]

Stark et al.

[11] Patent Number: 5,868,627
[45] Date of Patent: Feb. 9, 1999

[54] EXPANDABLE DRIVE SHAFT DAMPER AND METHOD OF FORMING

[75] Inventors: Martin H. Stark, Saginaw; Donald W. Brewster, Bay City; Gary A. Conger, Hemlock; Donald S. Agnew, Saginaw, all of Mich.

[73] Assignee: Martin H. Stark, Saginaw, Mich.

[21] Appl. No.: 779,789

[22] Filed: Jan. 7, 1997

[51] Int. Cl.⁶ .................................................. F16C 3/00
[52] U.S. Cl. ........................... 464/180; 464/181; 464/183
[58] Field of Search ............................... 442/98; 188/268; 64/1; 464/180, 181

[56] References Cited

U.S. PATENT DOCUMENTS 3,814,549  6/1974  Cronstedt ..................................... 417/7

Primary Examiner—Eggerton A. Campbell
Attorney, Agent, or Firm—Reising, Ethington, Learman & McCulloch, PLLC

[57] ABSTRACT

A vibration damping liner adapted to pass through a relatively small diameter end of a tubular shaft for accommodation in a relatively large diameter section of such shaft, the liner being formed of a plurality of coaxial, helically wound paperboard strips forming inner and outer layers. The confronting edges of adjacent convolutions of each layer are coplanar and unjoined, and the confronting edges of the convolutions of all but one of such layers register with one another. The paperboard strip forming the one layer bridges the confronting edges of the adjacent convolutions of the other layers and is adhesively secured to that layer adjacent such one layer. Such one layer has less resistance to rupture than any of the other layers.

22 Claims, 1 Drawing Sheet

EXPANDABLE DRIVE SHAFT DAMPER AND METHOD OF FORMING

This invention relates to an expandable, tubular liner adapted to be inserted in a hollow automotive drive shaft to damp vibrations and attenuate sound and to a method of forming such liner.

BACKGROUND OF THE INVENTION

An automotive vehicle conventionally utilizes a hollow, tubular drive or propeller shaft for transmitting driving torque from the engine to the driving wheels. It is not uncommon for such shaft to be subjected to vibrations from one or more sources. It is desirable to damp such vibrations so as to provide for a quieter and smoother ride.

Most of the propeller shafts in use heretofore have been of uniform diameter from one end to the other. Recently, however, some drive shafts have one or both ends which are of smaller diameter than the remainder of the shaft. A smaller diameter end for a drive shaft has certain advantages, such as enabling the use of smaller universal joints than otherwise would be possible, as well as minimizing the space and weight of the parts required to couple the shaft to the universal joints.

It has been common heretofore simply to slide a substantially cylindrical liner into a hollow drive shaft from one end thereof, the liner being made of materials which damp vibrations and attenuate noise. Typical examples of such liners are disclosed in U.S. Pat. Nos. 2,751,765; 3,075,406; 4,014,184; and 4,909,361.

Liners of the kind in use heretofore cannot be used with propeller shafts that have a larger diameter between its ends than at the ends for the reason that the liner must be pushed into the shaft through the smaller diameter end and, consequently, must be of smaller diameter than that of the shaft between its ends. A liner having a diameter less than that of the shaft in which it is accommodated cannot damp vibrations, but instead will contribute to vibrations because the liner inevitably will be relatively movable within the larger diameter portion of the shaft.

Ideally, once a vibration damping liner is accommodated in a shaft the liner will be immovable relative to the shaft. Such an arrangement makes it possible to balance the shaft with the liner in place, and the balance of the shaft will not be adversely affected as the result of subsequent shifting of the liner within the shaft.

The ability of a liner to remain fixed in place within a shaft depends on a number of factors. For example, the liner should be formed of material which is sufficiently springy to enable the liner to bear forcibly against the surface of the bore of the shaft and thereby minimize the possibility of slippage occurring between the liner and the shaft. However, the inside and outside diameters of shafts and liners, respectively, are formed to dimensions having some tolerances, as a consequence of which not all of the shafts and liners have uniform diameter dimensions. It is necessary, therefore, to ensure that the outer diameter of the liner is sufficiently greater than that of the inner diameter of the shaft so that a radially expansive force constantly is exerted by the liner on the shaft. However, liners may be manufactured and stored for a considerable period of time prior to their assembly with shafts. If the material from which the liners are made is hygroscopic, ambient humidity will have an effect on the springiness of such material, thereby affecting the ability of the liner to exert a binding force on the shaft.

All of the foregoing problems exist in those instances in which a liner must be pushed through a relatively small diameter end of a shaft for accommodation in a larger diameter portion of such shaft. The necessity of the liner's having to pass through a relatively small diameter simply adds to the complexity of the liner's ability to damp vibrations.

An object of the invention is to provide a liner for accommodation in a cylindrical shaft and which not only has superior vibration damping characteristics so as to be usable in shafts of uniform diameter, but which also is adapted to be used with a cylindrical shaft whose diameter is not uniform.

SUMMARY OF THE INVENTION

A liner constructed in accordance with the preferred embodiment of the invention is especially adapted for accommodation within a tubular shaft having a relatively small diameter at least at one end thereof and through which the liner must pass for retention in a larger diameter portion of such shaft. The liner has an initial outside diameter greater than that of the inside diameter of the larger diameter section of the shaft and is formed of springy material which has sufficient resilience and elasticity as to enable the outer surface of the liner, once the liner passes through the smaller diameter end of the shaft, to expand radially into engagement with the inner surface of the larger diameter section of the shaft.

The liner is formed from two or more layers or plies of helically wound paperboard strips, adjacent layers being adhesively secured to one another. Adjacent convolutions of each ply have confronting edges which are coplanar, but not joined to one another. Another of the plies of material is weaker than the other plies and also has adjacent convolutions whose confronting edges are coplanar but not joined to one another. The confronting edges of adjacent convolutions of such weaker ply are staggered relative to the confronting edges of the adjacent convolutions of the other ply or plies so that the adjacent convolutions of the weaker ply bridge the joint between the confronting edges of the adjacent ply.

The weaker ply preferably has less strength than the other plies thereby facilitating rupture of the weaker ply. Once the weaker ply is ruptured the opposite ends of the liner may be drawn away from one another so as to elongate the liner and shrink its diameter.

The liner in its elongated state may pass through the reduced diameter end of the shaft into the larger diameter section following which the resiliency and elasticity of the material from which the liner is made will enable the adjacent convolutions of the liner to expand radially into engagement with the surface of the bore of the larger diameter shaft section.

In those instances in which it is desirable to enhance stability of the liner within the shaft, the outer surface of the liner may be provided with a coating of highly frictional material, such coating being insufficient to interfere materially with the radial contraction and expansion of the liner.

THE DRAWINGS

A liner constructed in accordance with the invention is disclosed in the accompanying drawings wherein.

DETAILED DESCRIPTION

Figure 1:
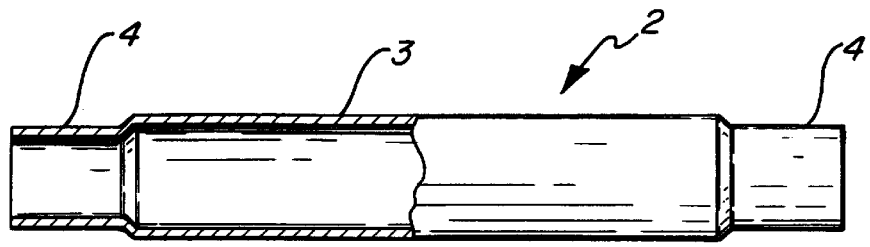
FIG. 1 is a partly elevational and partly sectional view of a typical drive shaft having relatively small diameter end sections and a relatively large diameter central section.

A liner constructed in accordance with the invention is designated generally by the reference character 1 and is adapted for use in a cylindrical, metal drive shaft 2 having a central section 3 of substantially uniform diameter and two end sections 4 of either the same or different diameters, but in any event less than the diameter of the central section 3. The shaft 2 may be one having both of its opposite ends 4 of reduced diameter as shown, or the diameter at one end could correspond to the diameter of the central section 3, the diameter at the other end being smaller. In any event, that end of the shaft 2 through which the liner 1 is to be inserted has a diameter smaller than that of the shaft section 3.

The liner 1 is composed of a plurality of layers or plies of helically wound strips of paperboard material as is conventional. In the disclosed embodiment, there is an innermost layer 5, an inner intermediate layer 6, an outer intermediate layer 7, and an outermost layer 8. All of the layers 5–8 are formed of paperboard strips 9–12, respectively, of uniform width. The innermost helically wound strip 9 forms a plurality of uniform width convolutions 13; the strip 6 forms a plurality of uniform width helical convolutions 14; the strip 7 forms a plurality of uniform width helical convolutions 15; and the strip 8 forms a plurality of uniform width helical convolutions 16.

Figure 3:
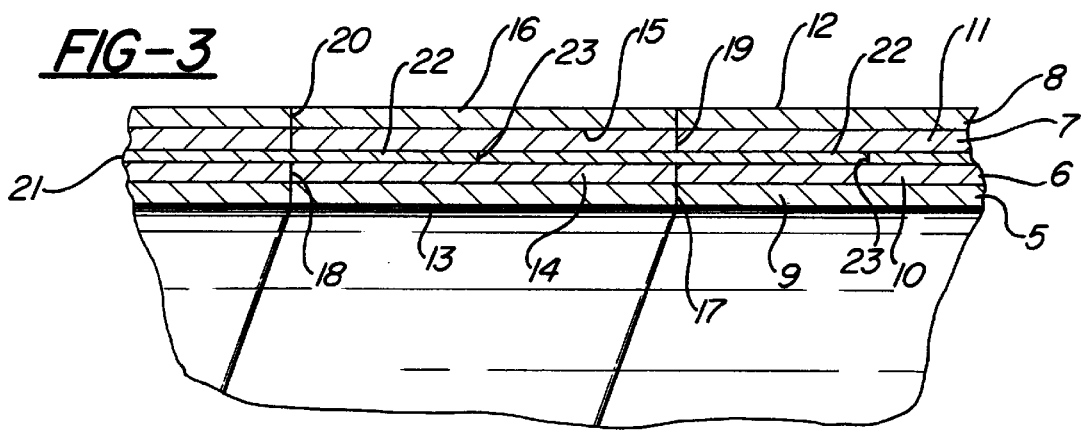
FIG. 3 is a greatly enlarged, fragmentary, sectional view illustrating a portion of the wall of the liner of FIG. 2.

Each of the convolutions 13, 14, 15, and 16 has its opposite edges confronting and abutting an edge of the adjacent convolution, and all of the convolutions of a single layer are coplanar. That is, no part of any convolution of a single layer overlaps any other convolution. Thus, between adjacent convolutions 9 is a joint 17, between adjacent convolutions 10 is a joint 18, between adjacent convolutions 11 is a joint 19, and between adjacent convolutions 12 is a joint 20. As is shown in FIG. 3, the joints 17–20 are in helical register with one another and all of the convolutions of each layer are coplanar.

The construction includes an additional, relatively easily rupturable layer 21 of paperboard material comprising a strip of uniform width and thickness helically wound to form a plurality of helical convolutions 22. All of the convolutions 22 are coplanar and no part of any convolution 22 overlaps any part of any other convolution 22. One edge of each convolution confronts and abuts an edge of the axially adjacent convolution 22 so as to form a joint 23 between the adjacent convolutions. The convolutions 22, however, are staggered with respect to the other convolutions 9–12 so that the joint 23 is axially displaced relative to the joints 17–20 of the other convolutions.

In the illustrated embodiment the layer 21 may be formed from the same kind of paperboard as the other layers, but it is thinner than the other layers so as to have less resistance to rupture. It is possible, however, for the layer 21 to be formed from material having the same thickness as that of the other layers, but of less strength, so as to be more easily ruptured.

In the formation of the liner 1, the strip 5 of material is helically wound on a rotating mandrel (not shown) in a conventional manner so as to produce the axially adjacent, helical convolutions 9. The strip 10 then is wound on the strip 9 so as to overlie the latter with the opposite edges of the strips in register. During the winding of the strips 9 and 10, an adhesive (not shown) is applied either to the outer surface of the strip 10, or the inner surface of the strip 10, or both, so as to adhere the strips 9 and 10 to one another.

Following winding of the strip 10 on the strip 9 the convolutions 22 are wound on the strip 10 to form the layer 21, but the convolutions 22 are staggered with respect to the strip 10 so that the joint 23 between opposite edges of the convolutions are axially offset from the opposite edges of the adjacent strip 10. During winding of the layer 21 adhesive (not shown) again is applied to the strip to adhere it to the outer surface of the layer 6.

Following winding of the layer 21 the layers 7 and 8 are wound on the layer 21 and in the same manner as the strips 5 and 6 are wound so that the joints 19 and 20 between adjacent convolutions 15 and 16 register with one another and with the joints 17 and 18. Again, adhesive (not shown) may be applied to the confronting surfaces of the strips 7 and 8 to adhere them to one another. In the final form of the liner the weaker layer 21 is sandwiched between the inner and outer pairs of layers.

The winding operations will produce an elongate tubular cylinder which may be cut radially at axially spaced intervals in a conventional manner to produce a liner of selected length.

Since the confronting edges of the convolutions of the layers 5–9 are unjoined, the layer 21 is necessary to prevent the liner from unwinding during its manufacture, shipment, and storage. The layer 21 retains the liner in its tightly wound condition because the convolutions of the layer 21 bridge the joints between the layers 6 and 7 and because those layers are secured to the layer 21, to each other, and to the layers 5 and 8.

Figure 2:
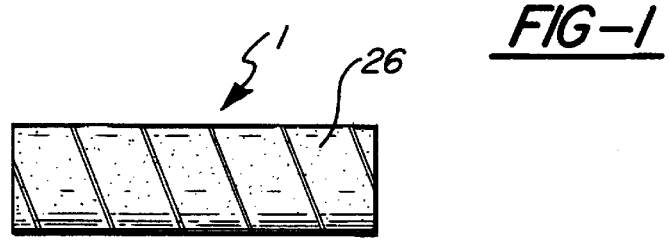
FIG. 2 is an elevational view of a liner prior to its being conditioned for insertion in the drive shaft.

In the form of the liner 1 illustrated in FIG. 2 it has a length greater than the length of either of the reduced end sections 4 of the shaft 2, but less than the length of the larger diameter section 3. The outside diameter of the liner 1 also is substantially greater than the inside diameter of the reduced shaft end portions 4, and preferably is greater than the inside diameter of the shaft section 3. The difference in the outside diameter of the liner 1 and the inside diameter of the shaft section 3 need not be great; a few tenths inch difference is satisfactory.

Figure 4:
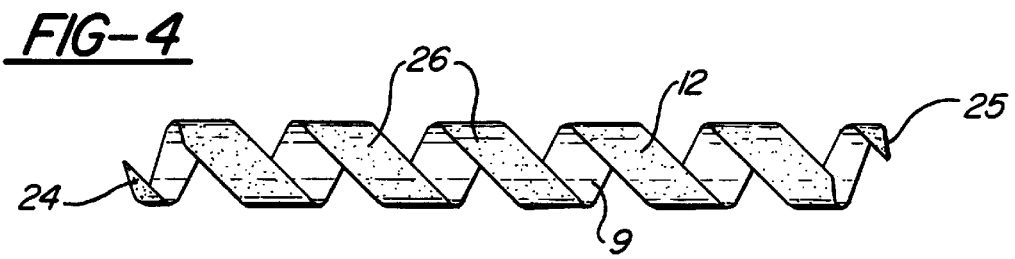
FIG. 4 is an elevational view of the liner shown in FIG. 2 expanded to increase its length and reduce its diameter.

Obviously, the diameter of the liner 1 in its condition shown in FIG. 2 is too great to pass through the reduced diameter end 4 of the shaft 2. However, if the strip material 22 constituting the layer 21 is ruptured or separated at the point that it bridges the joints 18 and 19, then the liner may be axially elongated or expanded by gripping opposite ends 24, 25 of the liner and applying a tensile force tending to stretch the liner. As the liner elongates, its outside diameter will shrink, as is shown in FIG. 4. The liner may be elongated an amount sufficient to shrink its diameter to a dimension sufficient to enable it to pass through the reduced diameter section 4 at one end of the shaft 2. Insertion of the expanded liner into the shaft 2 may be accomplished manually or by means of a tool (not shown) which releasably grips one end 24 of the liner while the opposite end 25 may be held manually or by the tool, thereby maintaining the liner in its expanded length condition.

The liner also may have its diameter reduced following rupture of the layer 21 by holding the end 24 and rotating the opposite end 25 while stretching the liner. This will cause each convolution to contract radially.

Preferably, the relatively weak layer 21 may be ruptured simply as a result of the elongation of the liner. If necessary, however, a knife may be passed through the joints 19 and 20 to cut the layer 21.

Figure 5:
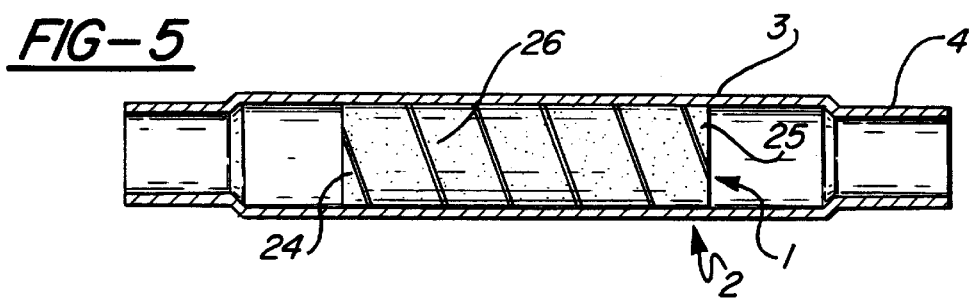
FIG. 5 is a sectional view of the shaft shown in FIG. 1 within which is the liner of FIGS. 2–4.

Following insertion of the expanded liner into the shaft 2 a distance sufficient to enable the entire liner to pass the reduced end section 4, the ends of the liner may be released, thereby enabling the resilience and elasticity of the material forming the liner convolutions to expand radially into engagement with the inner surface of the shaft section 3. The radial expansion of the liner convolutions will be accompanied by axial contraction of the liner, thereby enabling it to occupy a position within and bearing upon the inner surface of the larger diameter shaft section 3 as is shown in FIG. 5.

If desired, the outer surface of the liner may have a coating 26 applied thereto during or following the winding of the outer ply. The coating should be one having a coefficient of friction considerably higher than that of the strip material from which the outermost layer of the liner is formed, and it should be one which does not inhibit radial expansion and contraction of the liner. One suitable material is commercially available, high friction polyurethane. Another is a formulated rubber latex such as that manufactured by National Starch and Chemical Company, Bridgewater, N.J., and described in its specification 35-6198 relating to Resyn Self Seal. The frictional coating will enhance the ability of the liner to remain fixed in place within the shaft 2.

The disclosed embodiment is representative of a presently preferred form of the invention, but is intended to be illustrative rather than definitive thereof. The invention is defined in the claims.

What is claimed is:

1. A cylindrical liner for accommodation in a cylindrical member having a bore, said liner comprising inner and outer coaxial layers of helically wound strip material secured in overlying relation to one another, each of said layers having a plurality of axially adjacent, coplanar convolutions adjacent edges of which confront but are separate from one another, the convolutions of one of said layers being axially displaced relative to the convolutions of the other of said layers to an extent such that the confronting edges of adjacent convolutions of said one of said layers are axially offset from the confronting edges of the adjacent convolutions of the other of said layers, one of said layers being less resistant to rupture than the other of said layers.

2. The liner according to claim 1 wherein one of said layers has a thickness different from that of the other of said layers.

3. The liner according to claim 1 wherein the strip material of at least one of said layers is of substantially uniform width between its opposite edges.

4. The liner according to claim 1 wherein the strip material of said other layer is of substantially uniform width between its opposite edges.

5. The liner according to claim 1 wherein the outer layer has the greater resistance to rupture.

6. A cylindrical liner for accommodation within a cylindrical member having a bore, said liner comprising a plurality of coaxial layers of helically wound strip material secured to one another in overlying relation, all but one of said layers having a plurality of adjacent coaxial convolutions adjacent edges of which confront one another, are unjoined to one another, and do not overlap one another, said adjacent convolutions being displaceable axially of said member to elongate said member and reduce the diameter of said member, said material being sufficiently resilient as to enable said adjacent convolutions to have their opposite edges in register with one another, said one layer having its convolutions axially displaced relative to the convolutions of all the other layers to an extent such that the confronting edges of adjacent convolutions of said one layer are axially staggered relative to the confronting edges of the adjacent convolutions of all the said other layers.

7. The liner according to claim 6 wherein said one layer has less resistance to rupture than any of said other layers.

8. The liner according to claim 6 wherein said one layer is radially inward of at least one of the other layers.

9. The liner according to claim 6 wherein said one layer is sandwiched between two of the other layers.

10. The liner according to claim 6 wherein the strip material of each of the other layers is of substantially uniform width between its opposite edges.

11. The liner according to claim 6 wherein the strip material of said one layer is of substantially uniform width between its opposite edges.

12. The liner according to claim 6 wherein the strip material of each of said layers is of substantially uniform width between its opposite edges.

13. The liner according to claim 6 wherein said one layer is formed of strip material thinner than that of any of the other layers.

14. The liner according to claim 6 wherein said liner has an outer surface bearing a coating of material having a coefficient of friction greater than that of the strip material.

15. A cylindrical liner for accommodation within a cylindrical member having a bore, said cylindrical liner comprising at least one layer of helically wound, resilient strip material forming a plurality of adjacent, coplanar convolutions which abut one another, are unjoined to one another, and do not overlap one another, said strip material having such resilience as to enable said liner to elongate axially and shrink radially in response to the application of tensile force at opposite ends of said liner, the resiliency of said strip material enabling said liner to shrink axially and expand radially in response to removal of said tensile force.

16. A method of producing an expandable, cylindrical liner adapted for accommodation in a hollow, cylindrical member having axially spaced relatively smaller and larger diameter sections, said method comprising helically winding first and second strips of material to form inner and outer layers each of which has axially adjacent convolutions, each of the convolutions of at least one of said layers having axially adjacent edges which confront and are coplanar with one another, each of the convolutions of another of said layers having axially adjacent edges which are axially staggered relative to the confronting edges of said one of said layers; and adhesively securing said layers to one another, the material from which said another layer is formed having less resistance to rupture than that from which said one layer is formed.

17. The method according to claim 16 including winding said one of said layers on said another of said layers whereby said one of said layers is radially outward of said another of said layers.

18. The method according to claim 16 including applying to said outer layer a coating of material having a coefficient of friction greater than that of the material from which said outer layer is formed.

19. The method according to claim 16 including rupturing said another layer at the confronting edges of the convolutions of said one of said layers thereby enabling said liner to be elongated axially and shrunk diametrally.

20. A method of producing an expandable, cylindrical liner adapted for accommodation in a hollow, cylindrical member having at least at one end a relatively small diameter adjacent a relatively larger diameter section, said method comprising helically winding a plurality of uniform width strips of springy material about a mandrel and about each other to form a multiple layer, elongate cylinder having a diameter greater than that at said one end of said member, the strips of all but one of said layers overlying one another to form helical convolutions adjacent edges of which confront but are not joined to one another, the confronting edges of all of the adjacent convolutions being in register; winding the strip of said one of said layers to form helical convolutions which are axially staggered relative to the convolutions of the others of said layers and bridge the registered edges of the adjacent convolutions; securing all of said layers to one another; rupturing said one of said layers; and stretching the others of said layers to elongate said liner and reduce the diameter thereof to a dimension no greater than that of said one end of said member.

21. The method according to claim 20 wherein the strip of said one of said layers is weaker than the strips of the others of said layers.

22. A cylindrical liner for accommodation in a cylindrical member having a bore, said liner comprising a plurality of plies of helically wound, relatively stronger strips of uniform width material overlying and secured to one another and forming a plurality of adjacent convolutions having their confronting edges adjacent but not secured to each other, thereby forming a joint between the adjacent convolutions; and a single ply of helically wound, relatively weaker strip of material bridging the joint between said adjacent convolutions and secured to at least one of said relatively stronger strips, thereby maintaining said adjacent convolutions in assembled relation, the material forming said single ply being rupturable thereby enabling said adjacent convolutions to separate from one another, the material forming all of said plies being of sufficient resiliency as to enable said adjacent convolutions to elongate axially and shrink radially in response to the application of tensile force at opposite ends of said liner.

* * * * *